United States Patent [19]
Acks

[11] 3,875,548
[45] Apr. 1, 1975

[54] CALIBRATOR PLUG-IN-MODULE FOR SONOBUOY

[75] Inventor: Robert S. Acks, San Diego, Calif.

[73] Assignee: The United States of America as represented by the Secretary of the Navy, Washington, D.C.

[22] Filed: Mar. 1, 1974

[21] Appl. No.: 447,458

[52] U.S. Cl. .................................. 340/2, 340/5 C
[51] Int. Cl. .......................................... H04b 11/00
[58] Field of Search ............................ 340/2, 5 C

[56] References Cited
UNITED STATES PATENTS
2,999,225  9/1961  Gregg, Jr. et al. ............... 340/5 C

*Primary Examiner*—Richard A. Farley
*Attorney, Agent, or Firm*—Richard S. Sciascia; Ervin F. Johnston; William T. Skeer

[57] ABSTRACT

A calibrator module for a telemetered sonobuoy includes a complex audio generator and a timing circuit. The timing circuit initiates a calibration signal in response to the commencement of operation of the sonobuoy. A switching circuit connects the hydrophone-preamplifier of the sonobuoy into the circuit at the conclusion of the test signal sequence. An active filter is also included to assure the limitation of the audio calibration signal and the hydrophone-preamplifier signal to the same passband.

11 Claims, 4 Drawing Figures

CALIBRATOR PLUG-IN-MODULE FOR SONOBUOY

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of electronics. More particularly, this invention pertains to the field of electronic instrumentation. In still greater particularity, the invention pertains to the electronic aspects of oceanographic instrumentation. By way of further characterization, the invention pertains to calibration devices for oceanographic instrument packages. By way of further characterization, but without exclusive limitation thereto, the invention will be described as it pertains to a calibration package for a sonobuoy.

DESCRIPTION OF THE PRIOR ART

In modern times, man has shown great interest in monitoring oceanographic phenomena. In pursuit of these goals, it is often highly advantageous for one to deploy an acoustic monitoring device known as a sonobuoy in the vicinity of sources of underwater acoustic energy so as to provide a remote monitoring of these sources. In many models of these devices, aerial deployment is made possible by means of a device to control the descent of a sonobuoy from an aircraft into the water. An included telemetering package transmits the acoustic signals intercepted by the sonobuoy to the aircraft by means of a radio frequency telemetering link.

Although the state-of-the-art of the design and fabrication of electronics packages have attained a high order of quality control, individual variations, nonetheless, exist between individual units. In order to provide optimum utilization of these devices, each device has heretofore been calibrated at a shore installation and the calibration information corresponding to each unit is then utilized in analyzing the signal returns from the instrument.

Although the foregoing technique has provided qualified successful results, certain deficiencies in the system remain. Among these yet unsolved inefficiencies are the relative effects of the particular sea state and temperatures upon the operational package. Too, often times the electronic response of the individual sonobuoys changes between calibration and deployment.

For these and a variety of other reasons, the need has been felt for a method or device for calibrating the individual sonobuoy after it is deployed in its intended operational environment.

SUMMARY OF THE INVENTION

The invention provides a calibrator module which plugs into an existing power and test socket on a sonobuoy and provides for a calibration period which commences immediately after deployment of the sonobuoy. A detection circuit monitors the saltwater actuated battery and initiates a timing sequence signal. The timing sequence signal is used to provide a predetermined interval of operation of a complex audio-wave generator which produces an electrical output of known characteristics over the frequency band of interest. At the conclusion of the calibration cycle a switching circuit removes the calibration signal and reconnects the sonobuoys hydrophone-preamplifier circuits such that normal operation of sonobuoy continues.

STATEMENT OF THE OBJECTS OF INVENTION

Accordingly, it is a primary object of this invention to provide a calibration circuit.

A further object of this invention is to provide a calibration circuit for an acoustic monitoring device.

Another object of this invention is to provide an improved timing circuit for a sonobuoy.

Yet another object of this invention is to provide an improved calibration circuit having a complex audio test signal.

Yet another object of this invention is to provide for a calibration circuit for a sonobuoy which has a complex audio waveform.

Another object of this invention is to provide for a calibration test module for a sonobuoy which may be readily incorporated into existing units.

Yet another object of this invention is to provide a calibration module for a sonobuoy having a complex audio waveform over the acoustic range of interest and which may be easily incorporated into existing units.

These and other objects of the invention will become more readily apparent from the ensuing specification when taken together with the drawings and appended claims.

DESCRIPTION OF THE PREFERRED EMBODIMENT

Figure 1:
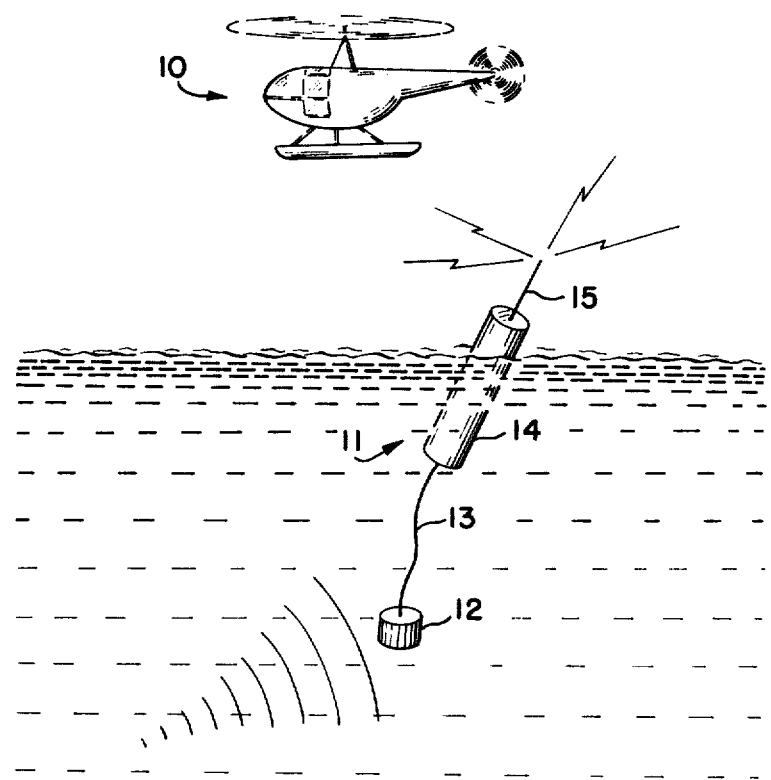
FIG. 1 is a perspective drawing showing a telemetered sonobuoy incorporating the calibrator of the invention in an operational environment.

Referring to FIG. 1, a sonobuoy is shown in an operational deployment on a surface of the sea. A hydrophone-preamplifier unit 12 is suspended by a flexible waterproof conductor 13 from a surface float portion 14 which houses the major portion of the electronics of the sonobuoy. An antenna 15 extends vertically above the body portion 14 to effectively radiate telemetered instrument signals to a nearby rotary wing aircraft indicated generally at 10.

Although aircraft 10 is illustrated as a rotary wing aircraft, it will be readily appreciated that other aircraft may be used as well. Also, a surface vessel may be used to monitor the output of sonobuoy 11 or, alternatively, other electronic relay links may be employed if desired.

Hydrophone-preamplifier 12 is shown as being supported a short distance beneath the surface floating body portion 14 of hydrophone 11 by a suitable length of electrical cable 13. Of course, any convenient operational depth may be used if desired. Likewise, additional anchors or weights may depend from hydrophone-preamplifier 12 and aid in the positioning or effective acoustic loading of the instrument. Since these details are well understood in the oceanographic instrumentation arts and have no direct bearing on the invention, further description of these features is deemed unwarranted in this discussion.

Figure 2:
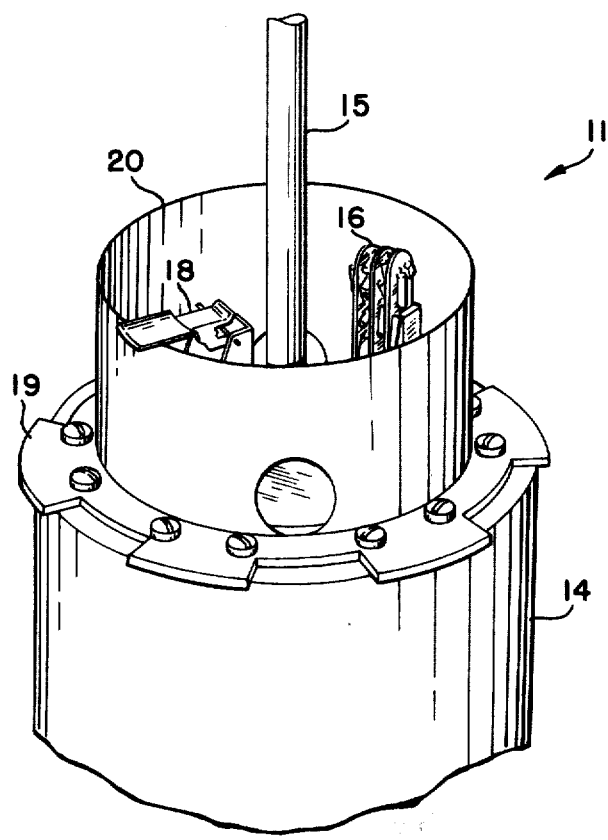
FIG. 2 is a perspective view of the upper portion of the sonobuoy of FIG. 1, with a protective cover removed, showing the location of the calibration module of the invention.

Referring to FIG. 2, the location of the circuit of the invention relative to the other physical parameters of the device is illustrated. As shown, body portion 14 has an antenna 15 extending vertically upward therefrom in the center of a protective sleeve 20. Closely adjacent to antenna 15 the circuit module of the invention is illustrated at 16. Module 16 conveniently plugs into an existing test socket which is commonly incorporated in sonobuoy designs for testing after final assembly and, in this position, its mounting does not require rewiring or other alteration of the electronic circuits housed in body portion 14. Further, as will be better understood with reference to the following discussion, this location permits calibrator 16 to be varied for individual acoustic requirements to which sonobuoy 11 will be utilized.

A clip 18 holds antenna 15 in its retractive position prior to deployment. Clip 18 and its cooperation with antenna 15 is a standard mechanical feature of such instruments and further description of its operational use is not relevant to the understanding of the calibration module. Accordingly, it will not be further described.

A flange 19 is provided to mount the deceleration control for sonobuoy 11 which may, in some instances, be a rotary wing chute resembling the rotary wing lift structure of illustrated aircraft 10. It should be noted that a cover, not shown, makes a waterproof seal with sleeve 20 and extends upward from flange 19. The cover is secured to flange 19 by means of threaded fasteners.

Figure 3:
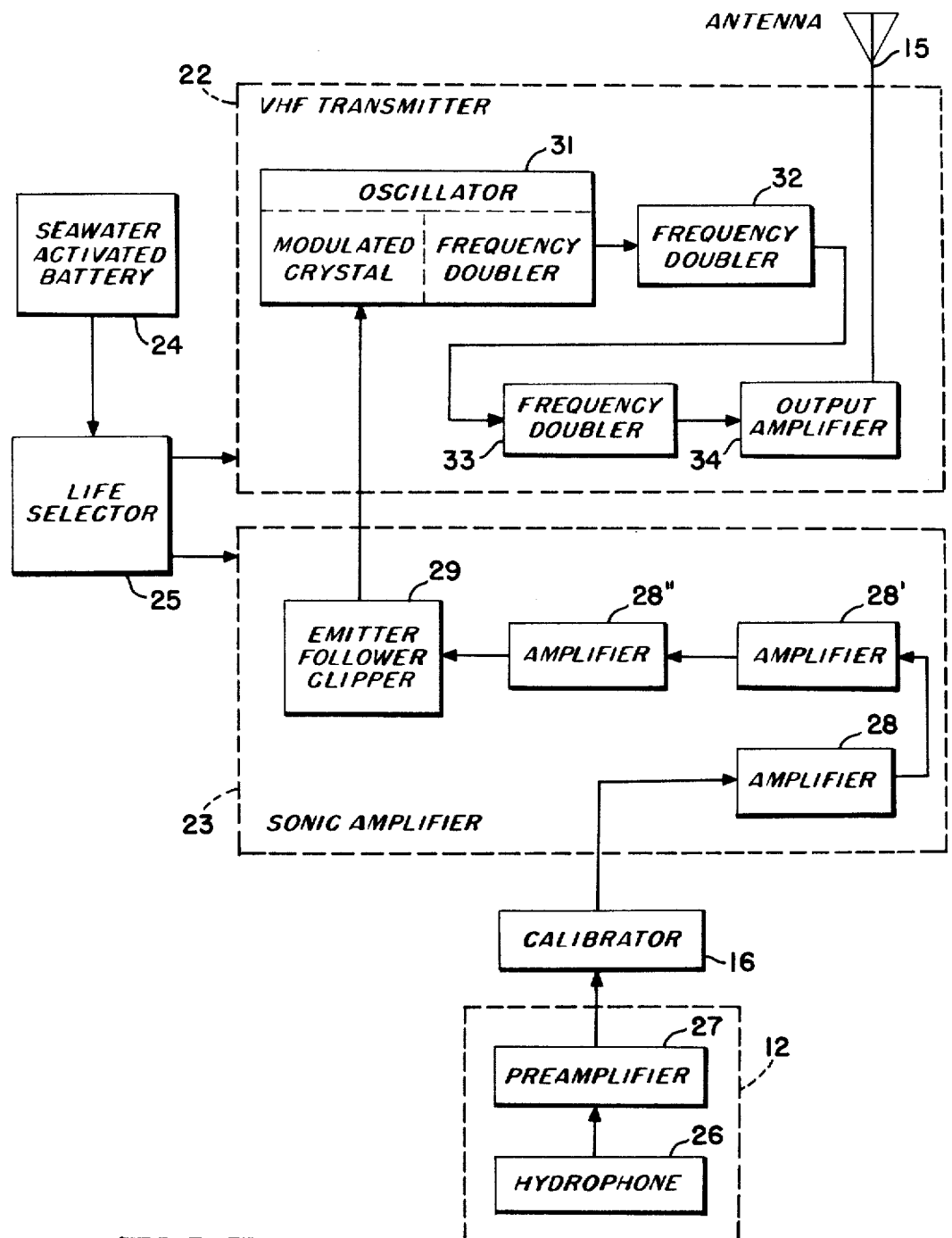
FIG. 3 is a block diagram showing the relationship between the calibrator of the invention and other circuit elements in the sonobuoy system.

Referring to FIG. 3, the circuit components of sonobuoy 11 are illustrated. In addition to hydrophone-preamplifier unit 12, a VHF transmitter 22 and a sonic amplifier 23 are housed within body 14. Also, a seawater actuated battery 24 is connected to the various electronic components through a life selector switch 25. As illustrated, the calibrator 16 is inserted in circuit between hydrophone-preamplifier unit 12 and sonic amplifier 23. In particular, it will be noted that hydrophone-preamplifier 12 includes a hydrophone 26 and a preamplifier 27. The location of preamplifier 27 in the remote unit with hydrophone 26 has been found to be advantageous to minimize signal loss and to provide a high signal level having low noise. Of course, in some applications, a remote location may be preferred. Calibrator 16 is connected to an amplifier 28 in sonic amplifier 23.

As illustrated, sonic amplifier 23 includes three stages of amplification 28, 28', and 28''. Of course, more or fewer stages of amplification may be used, as desired. An emitter-follower and clipper arrangement 29 is used to process the amplified acoustic signal and feed it to VHF transmitter 22.

VHF transmitter 22 is seen to include a modulated crystal oscillator and frequency doubler 31. A second frequency doubler 32 and a third frequency doubler 33 are utilized to produce an RF signal having the desired frequency. An output amplifier 34 boosts the power of the RF signal prior to coupling it to antenna 15.

Seawater actuated battery 24 and life selector 25 are conventional marine instrument power devices. Life selector 25 in addition to its power controlled functions, may scuttle sonobuoy 11 at the end of its useful life.

Figure 4:
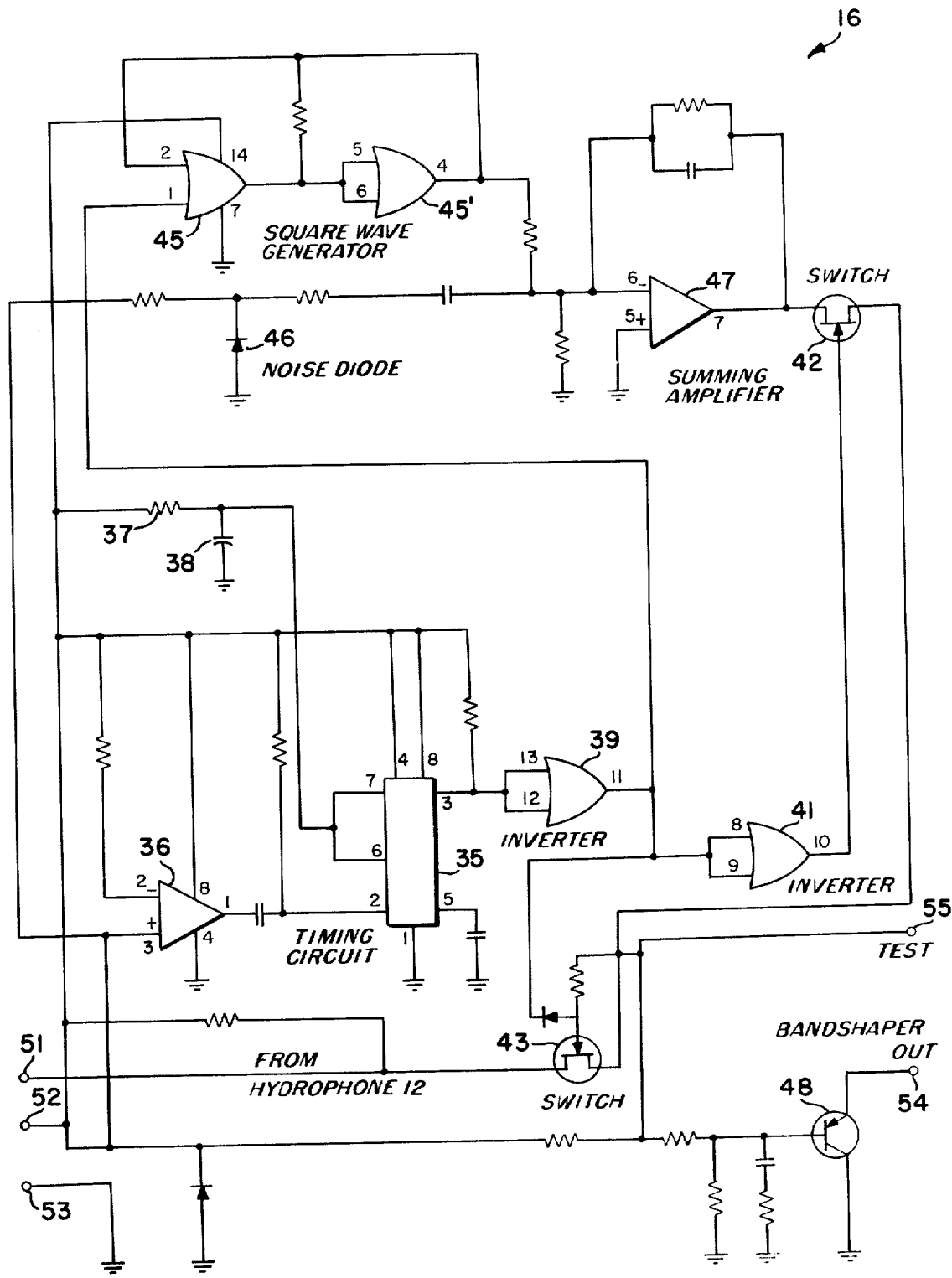
FIG. 4 is a schematic illustration of the calibrator module of the invention.

Referring to FIG. 4, the circuit details of calibrator module 16 are illustrated. A timing circuit 35 provides a square wave output of predetermined duration. Timing circuit 35 may be of any conventional type; however, for purposes of completeness, it should be noted that the commercially available printed circuit sold under the designator ME655 has proven satisfactory.

Timing circuit 35 has its timing cycle initiated by a voltage detector 36 which is connected to the seawater actuated battery power source. Thus, when the seawater actuated battery commences the supply of electrical energy, detector 36 turns timing circuit 35 on to commence its timing operation. The duration of the timing pulse from timing circuit 35 is determined by external RC components. For example, resistor 37 and capacitor 38 are shown as being used for this purpose. The value for resistor 37 of 1.5 megohms and a value for capacitor 38 of 10 microfarads provides, approximately, a five minute pulse which is sufficiently long to provide calibrating sonobuoy 11 and to assure the monitoring personnel of its successful operation.

The output of timing circuit 35 is connected to inverter 39, the output of inverter 39 is in turn connected to a square wave generator and a second inverter 41. Inverter 41 is connected to a solid state switch 42 while inverter 39 is also connected to a solid state switch 43. The square-wave generator comprises two printed circuits 45 and 45'. Inverter 39 and inverter 41, together with square-wave generator 45 and 45', are all component parts of a single printed micro-circuit which is sold under the designator CM4001A. Of course, other multiple function printed micro-circuits or individual components may be utilized, if desired.

The output of square-wave generator 45 and 45', and the output of a noise diode 46 are connected to a summing amplifier 47 where they are combined to produce a complex audio-wave. Amplifier 47 is a conventional operational amplifier sold under the designator MC1458 and noise diode 46 may be any noise generating diode producing the desired level and frequency output. However, it should be noted that in the invention the 1N4737A diode has proven satisfactory. Because inverter 39 operates switch 43 and inverter 41 which in turn operates switch 42, switch 42 or 43 can not be "on" simultaneously.

During the initial input from timing circuit 35 switch 42 is turned on and switch 43 is turned off. Switch 42 connects the output from summing amplifier 47 to an output terminal 54 via a band-shaping filter. The band-shaping filter, used in the invention, is an active filter and comprises a plurality of resistance and capacitance values connected with the active element, transistor 48.

At the conclusion of the timing interval switch 42 is turned "off" and switch 43 is turned "on" to couple the input from hydrophone 12 from terminal 51 through the band shaping filter to terminal 54, the ouput terminal. This connection is accomplished via switch 43, which like switch 42 may be a type 2N4392 transistor.

Terminal 52 is connected to the seawater actuated battery 24 and terminal 53 is connected to the ground connection of the remaining electronic components. A test output terminal 55 is also included such that the switching circuitry and audio output of calibrator 16 may be satisfactorily monitored during initial testing without dependence on a sonobuoy 11.

The foregoing description is sufficient to permit one versed in the oceanographic instrumentation arts to make and use the invention. However, a more complete understanding of the invention and its application will be obtained from the following description of the preferred mode of operation.

MODE OF OPERATION

Operation of the calibration module commences with the deployment of sonobuoy 11. When sonobuoy 11 impacts the water, the rotary drag chute, not shown, is released and antenna 15 is elevated by spring or compressed air drivers contained within sonobuoy 11. Likewise, hydrophone-preamplifier unit 12 is released and descends to a position beneath the body portion 14 of sonobuoy 11 as determined by the length of connecting cable 13. The placement of body portion 14 within the water activates seawater actuated battery 24 and power is supplied to the circuits in the electronic package including audio-amplifier 23 and VHF transmitter 22.

The activation of seawater activated battery 24 also supplies a voltage to detector 36 which initiates the timing cycle of timing circuit 35. As previously noted, the timing circuit 35 produces an output which is timed in duration by the values of resistance 37 and 38. This output is inverted by inverter 39 and triggers square-wave generator 45, 45' into oscillation and also has a noise output from noise diode 46 by application of regulated power thereto. These two audio signal outputs are combined by a summing amplifier 45 and supplied via transistor switch 42 to an active filter including transistor 48. This output is then coupled to sonic amplifier 23 where it is processed to provide a calibration signal.

This calibration signal modulates VHF transmitter 22 and personnel monitoring the output of sonobuoy 11 make appropriate adjustments to calibrate the receiving instruments.

At the termination of the timing cycle from timing circuit 35 switch 42 is turned "off" and switch 43 turned "on," via inverter 39. Operational personnel are alerted to this change of operation by virtue of the absence of the tone characterizing the operation of the square-wave generator. The opening of transistor switch 43 connects the output from the hydrophone circuit 12 to the active filter including transistor 48 such that this hydrophone signal is now applied to sonic amplifier 23 and the output thereof is used to modulate VHF transmitter 22 such that the desired oceanographic measurements may be obtained. From the foregoing it may be seen that the invention provides a method and means for the calibration of sonobuoys after their initial placement within the water. This description taken together with the appended claims constitutes a disclosure such as to enable a person skilled in the electronics and oceanographic instrumentation arts and having the benefit of the teachings contained therein to make and use the invention. Further, this system herein described meets the aforestated objects of invention, and generally constitutes a meritorious advance in the art which is unobvious to such persons not having the benefits of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. In a telemetered sonobuoy having a pendant hydrophone-preamplifier, and immersion power source, and a surfaced housed electronics package the improvement of a plug in calibrator module comprising:
   signal generating means for generating a predetermined audio signal;
   timing circuit means connected to said immersion actuated power source and said signal generating means for determining a fixed, predetermined operational interval for the signal generating means; and
   switching means connected between the sonobuoys hydrophone-preamplifier, and said signal generating circuit and connected to said timing circuit means for timely, alternative connection of the hydrophone-preamplifier or said signal generating means to the sonobuoys electronic package.

2. A calibrator module for a telemetered sonobuoy according to claim 1 in which said timing circuit means includes a voltage detector circuit connected to the immersion actuated power source.

3. A calibration circuit for a telemetered sonobuoy according to claim 2 in which said timing circuit means includes an RC controlled interval switch means.

4. A calibrator circuit for a telemeter sonobuoy according to claim 1 in which said signal generating means is a complex waveform audio generator.

5. A calibrator circuit for a telemeter sonobuoy according to claim 3 in which said signal generating means is a complex waveform audio generator.

6. A calibration circuit for a telemeter sonobuoy according to claim 4 in which said complex audio generator includes a square-wave oscillator and a noise diode generator.

7. A calibration circuit for a telemeter sonobuoy according to claim 5 in which said complex audio generator includes a square-wave oscillator and a noise diode generator.

8. A calibrator circuit for a telemeter sonobuoy according to claim 1 in which said switching means includes:
   a first inverter means connected to said timing circuit for inverting the voltage waveform output thereof; and
   a transistor switch connected to said inverter for actuation thereby and connected between the hydrophone-preamplifier and the input for the surface-housed electronic package.

9. A calibrator circuit for a telemeter sonobuoy according to claim 7 in which said switching means includes:
   a first inverter means connected to said timing circuit for inverting the voltage waveform output thereof; and
   a transistor switch connected to said inverter for actuation thereby and connected between the hydrophone-preamplifier and the input for the surface-housed electronic package.

10. A calibrator circuit for a telemetered sonobuoy according to claim 8 in which said switching means further includes a second inverter connected to said first inverter; and a solid state switch connected to said second inverter for actuation thereby and connected between said signal generating means and the input to the surface-housed electronics package.

11. A calibration circuit for a telemetered sonobuoy according to claim 10 in which the input for the surfaced-housed electronics package includes an active band-shaping filter.

* * * * *